(12) United States Patent
Schwaitzberg et al.

(10) Patent No.: US 11,928,633 B2
(45) Date of Patent: Mar. 12, 2024

(54) SYSTEMS AND METHODS FOR SIMULATING A RISK MODEL OVER TIME

(71) Applicant: MCKINSEY & COMPANY, INC., New York, NY (US)

(72) Inventors: Scott Jeffrey Schwaitzberg, New York, NY (US); Erik Alexander Roth, Westport, CT (US); Matthew John Banholzer, Kenilworth, IL (US); Marcin Chyczewski, Wroclaw (PL); Dushyant Agarwal, Rajasthan (IN)

(73) Assignee: MCKINSEY & COMPANY, INC., New York, NY (US)

( * ) Notice: Subject to any disclaimer, the term of this patent is extended or adjusted under 35 U.S.C. 154(b) by 0 days.

(21) Appl. No.: 17/711,326

(22) Filed: Apr. 1, 2022

(65) Prior Publication Data

US 2023/0153726 A1 May 18, 2023

(30) Foreign Application Priority Data

Nov. 12, 2021 (IN) .............................. 202111051967

(51) Int. Cl.
*G06Q 10/0635* (2023.01)
*G06Q 10/0637* (2023.01)

(52) U.S. Cl.
CPC ... *G06Q 10/0635* (2013.01); *G06Q 10/06375* (2013.01)

(58) Field of Classification Search
CPC .................................................. G06Q 10/0635
See application file for complete search history.

(56) References Cited

U.S. PATENT DOCUMENTS

| 10,963,817 | B2 * | 3/2021 | Jordan | G06N 7/01 |
|---|---|---|---|---|
| 2003/0149657 | A1 * | 8/2003 | Reynolds | G06Q 40/03 |
| | | | | 705/38 |
| 2003/0167265 | A1 * | 9/2003 | Corynen | G06Q 10/04 |
| 2021/0383407 | A1 * | 12/2021 | Pati | G06N 20/00 |
| 2022/0188701 | A1 * | 6/2022 | Röder | G16H 50/30 |

OTHER PUBLICATIONS

Appoh et al., Composite Hybrid Framework for Through-Life Multi-Objective Failure Analysis and Optimisation, IEEE access vol. 9, 2021, pp. 71505-71520 (Year: 2021).*

Aprillia et al., Statistical Load Forecasting Using Optimal Quantile Regression Random Forest and Risk Assessment Index, IEEE Transactions on Smart Grid, vol. 12, No. 2, Mar. 2021, pp. 1467-1480 (Year: 2021).*

* cited by examiner

*Primary Examiner* — Andre D Boyce
(74) *Attorney, Agent, or Firm* — MARSHALL, GERSTEIN & BORUN LLP; Randall G. Rueth

(57) ABSTRACT

Techniques for a modeling platform associated with simulating risk models. According to certain aspects, systems and methods include simulating the risk model over time. The risk model may include a hierarchical tree formed of component assumption objects associated with distribution functions. The systems and methods may apply a time function to generate time-adjusted values for the component assumption objects corresponding to defined distribution functions. The systems and methods may then combine the time-adjusted values to generate time-adjusted values for parent assumption objects.

18 Claims, 14 Drawing Sheets

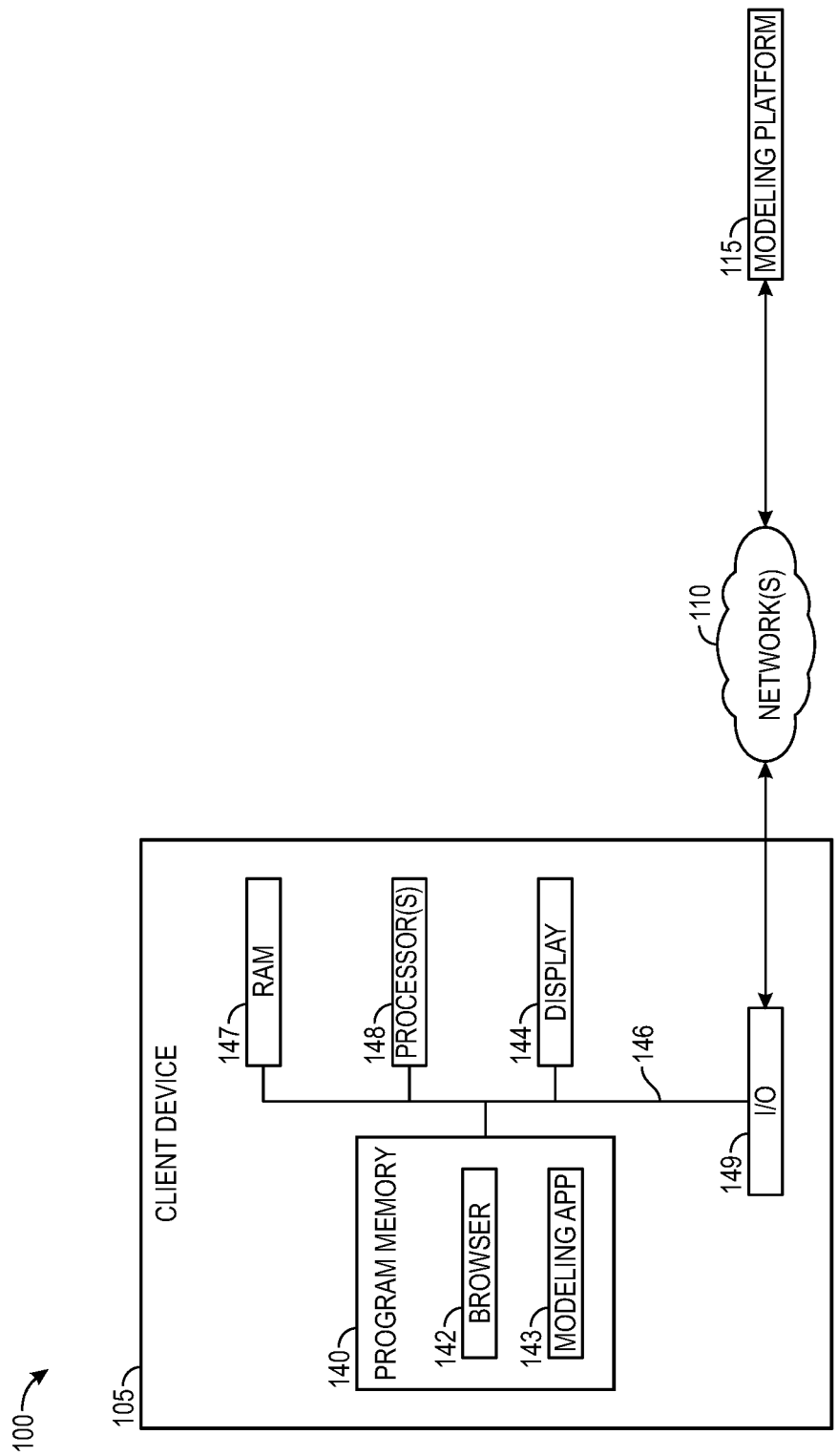

| YEARLY | QUARTERLY | MONTHLY | | | | | | | | | | | |
|---|---|---|---|---|---|---|---|---|---|---|---|---|---|
| ASSUMPTION NAME | CHANGE OVER TIME | + | 2021 | 2022 | 2023 | 2024 | 2025 | 2026 | 2027 | 2028 | 2029 | 2030 | + FINANCIAL MODEL VALUE | CAGR |
| EBITDA | | | | $-1.5M | $-1.5M | $-1.6M | $-1.6M | $-1.5M | $-1.4M | $-1.2M | $-938,692.9 | $-502,340. | $-455,852.3 | ↓12.7% |
| REVENUE FROM SUBSCRIPTIONS | | | | $1M | $1.3M | $1.6M | $2M | $2.4M | $3M | $3.7M | $4.6M | $5.7M | $1.4M | ↑23.8% |
| EXISTING SUBSCRIBER REVENUE | | | | $6.6 | $22.3 | $41.8 | $56.5 | $79.3 | $107.7 | $139 | $187.7 | $253.4 | $37.3 | ↑57.8% |
| ANNUAL SUBSCRIPTION PRICE | ◢ 465D | | | $443.8 | $489.5 | $540 | $595.7 | $657.2 | $729 | $799.7 | $882.2 | $973 | $494.5 | ↑10.3% |
| ANNUAL IMPLIED VALUE FOR FOUR... | 465A | 466A | | $588.7 | $630.5 | $675.3 | $723.2 | $774.6 | $834.2 | $888.5 | $951.6 | $1,019 | $619.7 468D | ↑7.1% |
| ANNUAL CLOTHING EXPENSE PE... | ☒ MANUAL ⊙ | | | $1,441.1 | $1,469.9 | $1,499.9 | $1,529.3 | $1,559.9 | $1,600 | $1,622.9 | $1,655.4 | $1,688.2 | $1,386 468A | ↑2% |
| PERCENT SPEND ON OUTWEAR A... | ⊙ CAGR ⊙ | 466B | | 40.9% | 42.9% | 45.1% | 47.3% | 49.7% | 52.2% | 54.8% | 57.5% | 60.4% | 45.1% | ↑5% |
| REPLACEMENT SPEND ON SUBS... | ⊙ FIXED ⊙ | | | 100% | 100% | 100% | 100% | 100% | 100% | 100% | 100% | 100% | 99.8% | 468B ↑% |
| GROWTH DISCOUNT RATE 465C | ⊙ CAGR ⊙ | | | 75.4% | 77.6% | 80% | 82.4% | 84.8% | 87.4% | 90% | 92.7% | 95.5% | 80% | ↑3% |
| EXISTING SUBSCRIBERS | | 466C | | 0 | 0 | 0.1 | 0.1 | 0.1 | 0.1 | 0.2 | 0.2 | 0.3 | 0.1 | ↑43% |
| PARENT'S FRUSTRATED WITH EXPEN... 465B | ⊙ CAGR ⊙ | | | 74.3% | 75.8% | 77.3% | 78.9% | 80.4% | 82.1% | 83.7% | 85.4% | 87.1% | 77.3% 468C | ↑2% |
| YEAR 3 MARKET PENETRATION | ☒ MANUAL ⊙ | | | 2% | 6% | 10% | 12% | 15% | 18% | 20.8% | 24.9% | 29.9% | 10% | ↑40.2% |

> IN-MARKET TEST QUESTIONS  8 TASKS

| TASK NAME ◇ 511 | ASSIGNEE ◇ 512 | STATUS ◇ 513 | UNCERTAINTY CONTRIBUTION ◇ 514 | LINKS ◇ 515 | |
|---|---|---|---|---|---|
| VALIDATE REPEAT PURCHASE BEHAVIOR OF FIRST-TIME BUYERS AFTER CLOTHING TRIAL | ASSIGN USER ⌄ | NOT STARTED | $XXX | 🔗1 | ⋯ |
| VALIDATE REPEAT PURCHASE BEHAVIOR OF OCCASIONAL BUYERS AFTER CLOTHING TRIAL | ASSIGN USER ⌄ | NOT STARTED | $XXX | 🔗1 | ⋯ |
| VALIDATE REPEAT PURCHASE BEHAVIOR OF OCCASIONAL BUYERS AFTER WHOLE SYSTEM TRIAL | ASSIGN USER ⌄ | NOT STARTED | $XXX | 🔗2 | ⋯ |
| VALIDATE REPEAT PURCHASE BEHAVIOR OF FIRST-TIME BUYERS AFTER WHOLE SYSTEM TRIAL | ASSIGN USER ⌄ | NOT STARTED | $XXX | 🔗2 | ⋯ |
| VALIDATE REPEAT PURCHASE BEHAVIOR OF HIGH FREQUENCY BUYERS AFTER CLOTHING TRIAL | ASSIGN USER ⌄ | NOT STARTED | $XXX | 🔗3 | ⋯ |
| DETERMINE UPSELL PATH PROM CLOTHING/OTHER PURCHASE TO WHOLE SYSTEM FOR ALL THREE SEGMENTS | ASSIGN USER ⌄ | NOT STARTED | $XXX | 🔗3 | ⋯ |
| TRADE SPEND IMPACT ON TRIAL VIA IN-MARKET TESTS (END-CAPS) | ASSIGN USER ⌄ | NOT STARTED | $XXX | 🔗0 | ⋯ |
| VALIDATE REPEAT PURCHASE BEHAVIOR FOR HIGH FREQUENCY BUYERS AFTER WHOLE SYSTEM TRIAL | ASSIGN USER ⌄ | COMPLETED | $XXX | 🔗1 | ⋯ |

+ ADD TASK  520

FIG. 5A

SYSTEMS AND METHODS FOR SIMULATING A RISK MODEL OVER TIME

CROSS-REFERENCE TO RELATED APPLICATIONS

The present application claims priority to Indian Patent Application No. 202111051967, filed on Nov. 12, 2021, the entire disclosure of which is hereby incorporated by reference.

FIELD OF THE DISCLOSURE

The present application relates generally to a modeling platform and, more particularly, to a modeling platform capable of simulating a risk model over a predefined time period

BACKGROUND

When developing a business plan, it is important to fully understand the various risks involved. One example technique to understand risk is a reverse profit and loss analysis during which a bottom line is broken down into the component contributions to profits and losses. This provides greater insight into the specific sources of profits and losses. It should be appreciated that each of these factors may be associated with different amounts of uncertainty. Accordingly, prior techniques that attempt to model just profits and losses without breaking out the component sources may result in an inaccurate model that does not reflect the true underlying risks. This inaccuracy is compounded when projecting the risks forwards or backwards in time. Accordingly, there is a need for more accurate time simulations of risk models.

Additionally, when analyzing a risk model, there is an inherent amount of uncertainty introduced by the modeling algorithms. Each component factor of the risk model provides a respective amount uncertainty to the overall amount of uncertainty with the risk model. By identifying the particular sources of uncertainty, one can identify the particular areas of focus on which to conduct additional studies that will have the greatest impact on reducing uncertainty in the overall risk model. Accordingly, there is a need for identifying the component uncertainty contributions and updating the risk models based upon tasks performed to reduce the component uncertainty contributions.

In another aspect, there are external factors that impact component factors of a risk model. For example, there may be a 5% risk of significant shipping delays due to a variety of possible causes or an 80% a product receives regulatory approval. Thus, there is a need to identify the true impact of external factors on the risk model to more accurately understand the corresponding risks associated therewith.

SUMMARY

In an embodiment, a computer system for simulating a risk model over time is provided. The system includes (1) one or more processors and (2) one or memories configured to store (i) a risk model, and (ii) computer executable instructions that, when executed by the one or more processors, cause the system to execute a simulation of the risk model. The risk model includes a hierarchical tree formed of component assumption objects having a parent-child relationship, wherein assumption objects correspond to a distribution function, wherein (a) a simulated value for a parent assumption object is based upon the distribution functions for the child assumption objects, and (b) the assumption objects correspond to a time function. To execute the simulation, the instructions, when executed cause the system to (1) sample a value from the distribution functions corresponding to the assumption objects; (2) calculate an instantaneous assumption value for the assumption objects based on the sampled value for the assumption object and/or the sampled values for child assumption objects; (3) obtain an interval duration for the simulation; (4) generate a time-adjusted value for a plurality of time intervals of the obtained interval duration by applying the time function for the assumption objects to the respective instanteous assumption values; and (5) calculate a time-adjusted assumption value for parent assumption objects based on the time-adjusted values for the assumption objects.

In another embodiment, a computer-implemented method for simulating a risk model over time is provided. The risk model includes a hierarchical tree formed of component assumption objects having a parent-child relationship, wherein (i) assumption objects correspond to a distribution function, (ii) a simulated value for a parent assumption object is based upon the distribution functions for the child assumption objects, and (iii) the assumption objects correspond to a time function. The method includes (1) sampling, by one or more processors, a value from the distribution functions corresponding to the assumption objects; (2) calculating, by the one or more processors, an instantaneous assumption value for the assumption objects based on the sampled value for the assumption object and/or the sampled values for child assumption objects; (3) obtaining, by the one or more processors, an interval duration; (4) generating, by the one or more processors, a time-adjusted value for a plurality of time intervals of the obtained interval duration by applying the time function for the assumption objects to the respective instantaneous assumption values; and (5) calculating, by the one or more processors, a time-adjusted assumption value for parent assumption objects based on the time-adjusted values for the assumption objects.

In yet another embodiment, a non-transitory computer-readable medium storing computer executable instructions thereon is provided. The instructions, when executed by one or more processors, simulate a risk model over time. The risk model includes a hierarchical tree formed of component assumption objects having a parent-child relationship, wherein (i) assumption objects correspond to a distribution function, (ii) a simulated value for a parent assumption object is based upon the distribution functions for the child assumption objects, and (iii) the assumption objects correspond to a time function. To simulate the risk model, the instructions, when executed, cause the one or more processors to (1) sample a value from the distribution functions corresponding to the assumption objects; (2) calculate an instantaneous assumption value for the assumption objects based on the sampled value for the assumption object and/or the sampled values for child assumption objects; (3) obtain an interval duration; (4) generate a time-adjusted value for a plurality of time intervals of the obtained interval duration by applying the time function for the assumption objects to the respective instanteous assumption values; and (5) calculate, a time-adjusted assumption value for parent assumption objects based on the time-adjusted values for the assumption objects.

BRIEF DESCRIPTION OF THE DRAWINGS

FIGS. 1A and 1B is a block diagram of an example environment that includes a modeling platform configured to execute the analytics techniques described herein;

FIG. 4A is an example user interface presented by a client device interacting with the modeling platform, the user interface for simulating a risk model over time;

FIG. 5A is an example user interface presented by a client device interacting with the modeling platform, the user interface for configuring tasks associated with component assumption objects of a risk model;

DETAILED DESCRIPTION

As it is used generally herein, the term "risk model" refers to a probabilistic model of a given parameter. The risk model may include a hierarchal tree that breaks the parameter into component parameters that, when combined in a specified manner, produce a value for the given parameter. For example, if the risk model relates to earnings before interest, taxes, depreciation, and amortization (EBITDA), the hierarchical tree may include a tier that subtracts costs from revenue. In this example, the costs and revenues may then be broken down into further tiers to represent the various component factors of those parameters. While the instant disclosure provides various example risk models associated with modeling EBITDA, risk models that model other parameters, such as net present value (NPV), revenue, number of customers, carbon reduction/credits, etc. are envisioned. Accordingly, any reference to a particular component of a risk model that models EBITDA envisions an equivalent component of a risk model that models an alternate parameter.

Figure 1A:
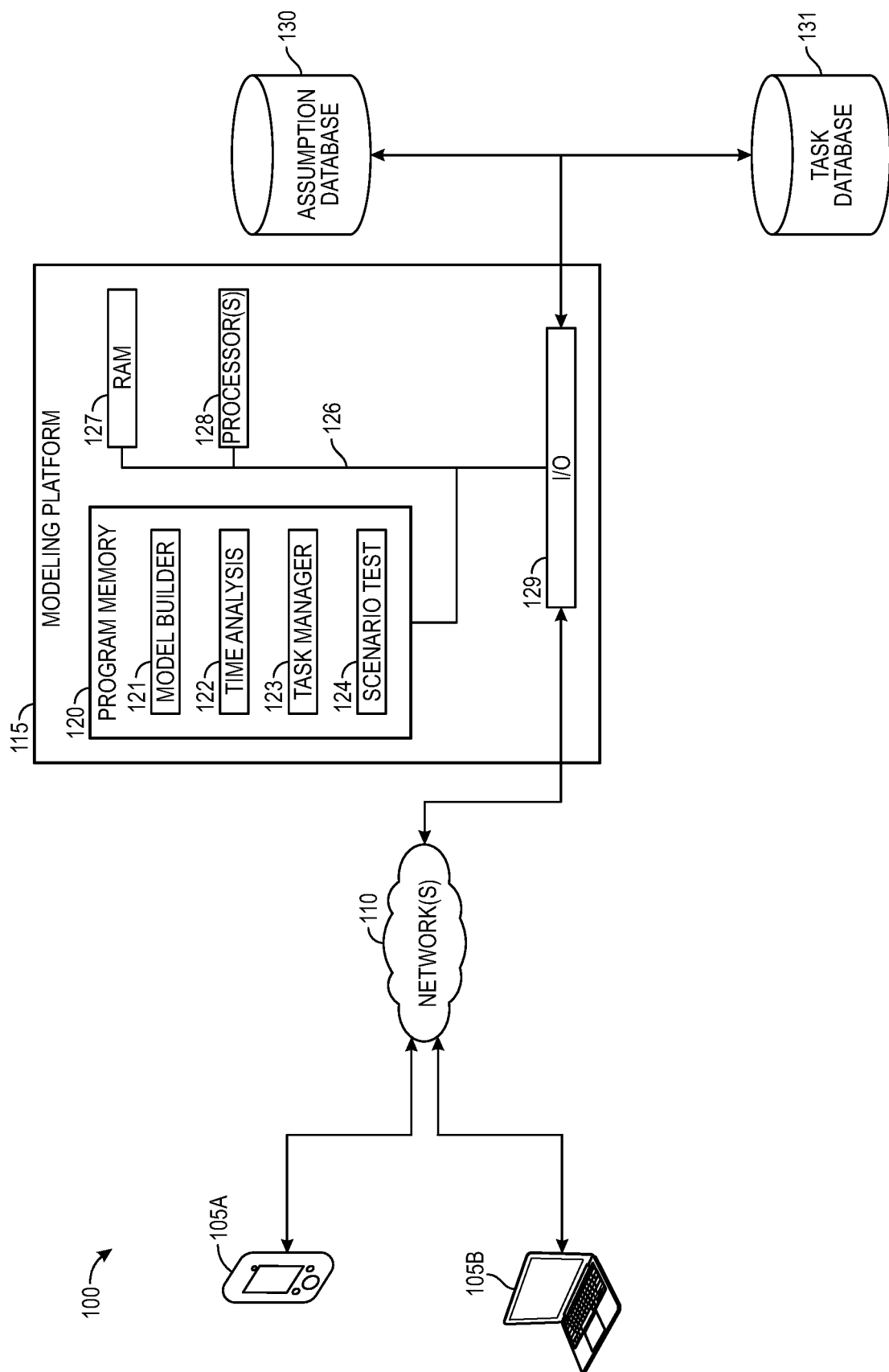

Referring now to FIGS. 1A and 1B, illustrated is an example environment 100 that includes a modeling platform 115 configured to simulate risk models built therewith. To interact with the modeling platform 115, a user interacts with a client device 105, such as mobile phone 105a, laptop computer 105b, a tablet, a smart wearable device (e.g., smart glasses, a smart watch), a home personal assistance device, or any other electronic device that is normally used to access internet-based content. The client devices 105 are communicatively coupled to the modeling platform 115 via one or more wired or wireless networks 110 that facilitate any type of data communication via any current or future-developed standard or technology (e.g., GSM, CDMA, TDMA, WCDMA, LTE, NR, EDGE, OFDM, GPRS, EV-DO, UWB, IEEE 802 including Ethernet and Wi-Fi, WiMAX, Bluetooth, and others). Although FIG. 1 only illustrates two client devices 105, the environment 100 may include any number of client devices 105.

The modeling platform 115 includes one or more processors 128 configured to execute instructions that form the various applications, modules, and other components of the modeling platform 115 described herein. The processors 128 may include central processing units (CPUs), graphics processing units (GPUs), application-specific integrated circuits (ASICS), and/or any other types of computer processors. While the disclosure may generally refer to the processors 128 executing the various tasks described herein, particular tasks may be better suited to one type of processor. For example, the repetitive analysis associated with some types of modeling algorithms may be more efficiently executed by GPUs than CPUs. Accordingly, in embodiments that include multiple types of processors, the analytics platform 115 may utilize a particular type of processor to execute instructions that is more efficiently executed by the particular type of processor.

Additionally, it should be appreciated that while FIG. 1A illustrates that analytics platform 115 as a single entity, in other embodiments, the analytics platform 115 may be multiple entities acting in conjunction with one another. For example, in some embodiments, the analytics platform 115 is implemented in a distributed computing environment, such as a cloud computing environment. In these embodiments, the processors 128 may be physically located in different hardware entities (e.g., servers) despite the processors 128 being logically connected in the depicted manner to execute the various tasks described herein.

The analytics platform 115 may also be operatively connected to an assumption database 130 configured to store assumption objects and a task database 131 configured to store task objects. The databases 130, 131 may utilize any known database architecture. In one implementation, the databases 130, 131 are relational databases that link multiple data tables together through index values. It should be appreciated that while FIG. 1A depicts the databases 130 and 131 as separate database, in some embodiments, a single database entity maintains both the assumption objects and the task objects.

As will be described in more detail below, an assumption object corresponds to a component factor for the given parameter corresponding to the risk model. Accordingly, the assumption object may include a description of the factor. The assumption object also includes an indication of a probability distribution function (and the corresponding parameters) that models a range of possible outcomes for the factor modeled by the assumption object. For example, the probability distribution function may be a triangle distribution. In this example, the parameters may be a maximum, a minimum, and a median value (also referred to herein as a "best guess" value). Of course, the assumption object may be associated with other known types of probability distribution functions, such as normal distribution functions, a uniform distribution function, or a binomial distribution.

As the assumption objects are added to the hierarchical tree that defines the risk model, a particular assumption object may be assigned parent and child assumption objects. Accordingly, an assumption object may include indications of the parent assumption object and any child assumption objects. For some assumption objects, the probability distribution function is a combination of one or more probability distribution functions for the child assumption objects. As one example, if revenue is assumed to be price*quantity, than the revenue assumption object may have a probability distribution function that is the product of the probability distribution functions of the price assumption object and the quantity assumption object.

Additionally, an assumption object may include an indication of any task objects assigned thereto. Generally, a task object corresponds to a particular task to be performed that provides more insight into the assigned assumption(s) thereby reducing uncertainty with the assumption. Typically, this means narrowing the probability distribution function of the corresponding assumptions. Accordingly, the task objects may include a description of the task and a reference to the assumptions objects influenced by the result of the task.

In the illustrated embodiment, the modeling platform 115 also includes a program memory 120, a random-access memory (RAM) 127, and an input/output (I/O) circuit 129, all of which may be interconnected via an address/data bus 126. It should be appreciated the memory of the modeling platform 115 may include multiple RAMs 127 and multiple program memories 120 implemented as any type of memory, such as semiconductor memory, magnetically readable memory, or optically readable memory, for example. Similarly, although the I/O circuit 129 is shown as a single block, it should be appreciated that the I/O circuit 129 may include a number of different types of I/O circuits. For example, the I/O block 129 may include one or more transceiver circuits to facilitate communications over the networks 110 and/or directly with databases 130, 131.

The program memory 120 may store any number of applications, routines, tools, or other collections of computer-readable instructions that support the analytics techniques described herein. For example, the program memory 120 may include applications 121-124 that support the risk model simulation techniques described herein. For example, the program memory 120 may include a model builder 121 via which a user constructs the hierarchical tree that forms the risk model, a time analyzer 122 via which a user simulates a risk model over time, a task manager 123 via which a user configures task objects, and a scenario tester 124 via which a user simulates the impact of external factors on the risk model. In some embodiments, the program memory 120 also includes a navigation application (not depicted) that enables the user to select between that various applications supported by the modeling platform 115.

Similar to the modeling platform 115 and as shown in FIG. 1B, the client device 105 includes the program memory 140, one or more processors 148, a random-access memory (RAM) 147, a display 144, and an input/output (I/O) circuit 149, all of which may be interconnected via an address/data bus 146. It should be appreciated the memory of the client device 105 may include multiple RAMs 147 and multiple program memories 140 implemented as any type of memory, such as semiconductor memory, magnetically readable memory, or optically readable memory, for example. Similarly, although the I/O circuit 149 is shown as a single block, it should be appreciated that the I/O circuit 149 may include a number of different types of I/O circuits. For example, the I/O block 149 may include one or more transceiver circuits to facilitate communications over the networks 110.

In some embodiments, the program memory 140 includes a browser application 142 that enables the participant to access a website associated with the modeling platform 115. Additionally or alternatively, the program memory 140 includes a dedicated modeling application 143 for interacting with the modeling platform 115. The modeling application 143 may be downloaded to the client device 105 via an application store, downloaded from a website, or otherwise installed onto the client device 105. In some embodiments, the modeling application 143 is a standalone executable application that generates and presents interfaces on the display 144 associated with the applications 121-124. In other embodiments, the modeling application 143 is a plugin, bookmarklet, or other software package that modifies the operation of the browser 142.

Returning to the modeling platform 115, the model builder 121 may be configured to enable the user to view and/or configure a hierarchical tree of a risk model. With simultaneous reference to FIG. 2A, an example user interface 200 presented by the client device 105 when interacting with the modeling platform 115 is depicted. The user interface 200 illustrates a tree view of an example portion of a hierarchical tree 260 for a risk model related to modeling profits related to a clothing business plan. That said, the model builder 121 may be configured to enable a user to view any tier, node, object, etc. included in the hierarchical tree 260.

Figure 2A:
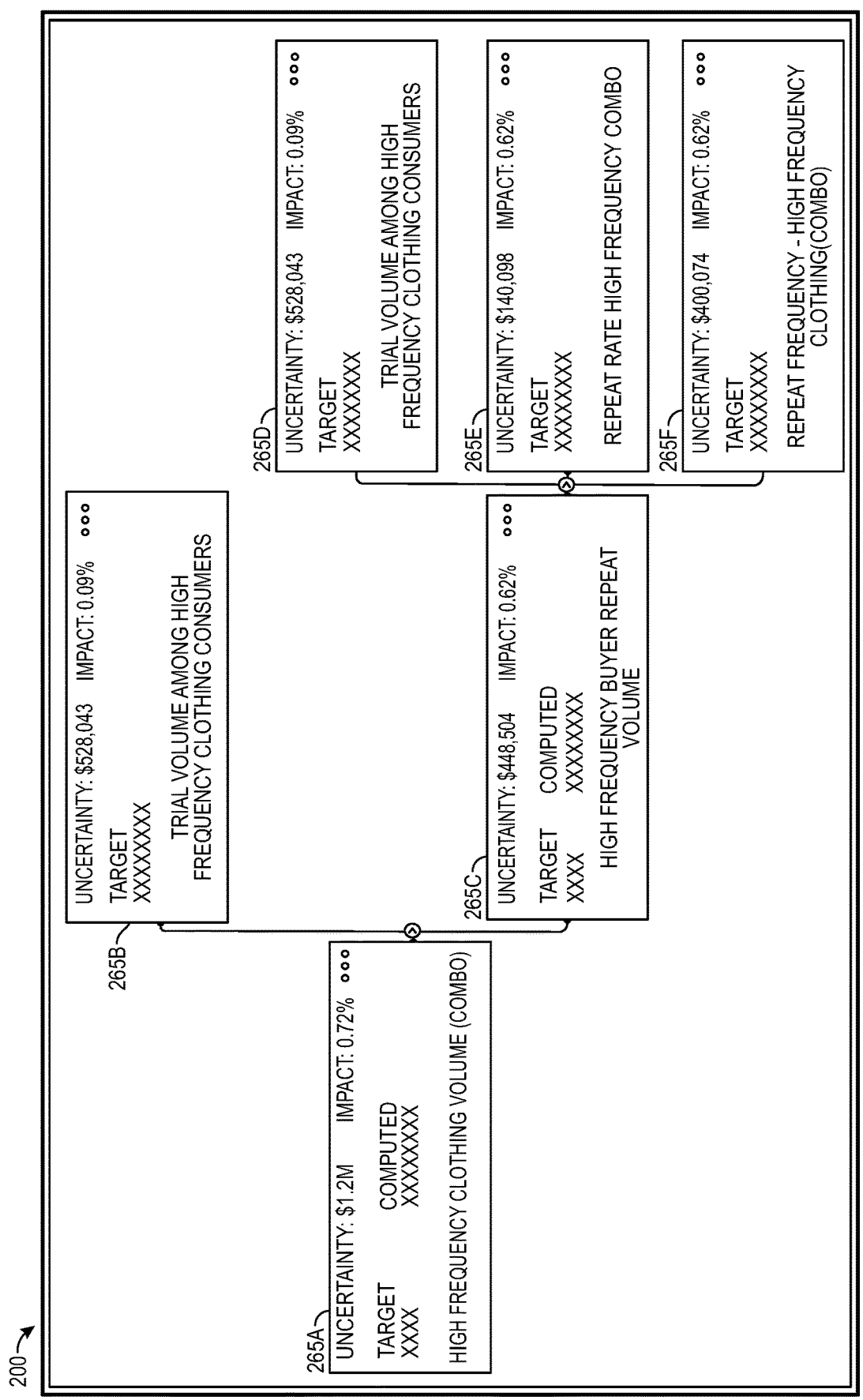
FIG. 2A is an example user interface presented by a client device interacting with the modeling platform, the user interface for viewing a hierarchical tree associated with a risk model.

In the illustrated example of FIG. 2A, the portion of the hierarchical tree 260 includes a parent assumption object 265a ("High Frequency Clothing Volume (combo)"), two child assumption objects 265b ("Trial volume among high frequency clothing customers") and 265c ("High Frequency buyer Repeat Volume"), and three grandchild assumption objects 265d ("Trial volume among high frequency clothing customers"), 265e ("Repeat Rate high frequency combo"), and 265f ("Repeat Frequency—high frequency clothing (combo)") related to the child assumption object 265c. Each of the assumption objects 265 corresponds to an assumption object stored at the database 130.

It should be appreciated that the assumption objects 265b and 265d are actually different instances of the same assumption object. When the hierarchical tree 260 includes multiple instances of the same assumption object 265, each instance may have its own relational information about parent and child assumption objects. That said, each instance of the assumption object 265 may be configured have the same probability distribution function. Accordingly, when the modeling platform 115 simulates the risk model, the sampled values for instance of the assumption object 265 may use the same sampled value regardless of the location in the hierarchical tree 260.

Figure 2B:
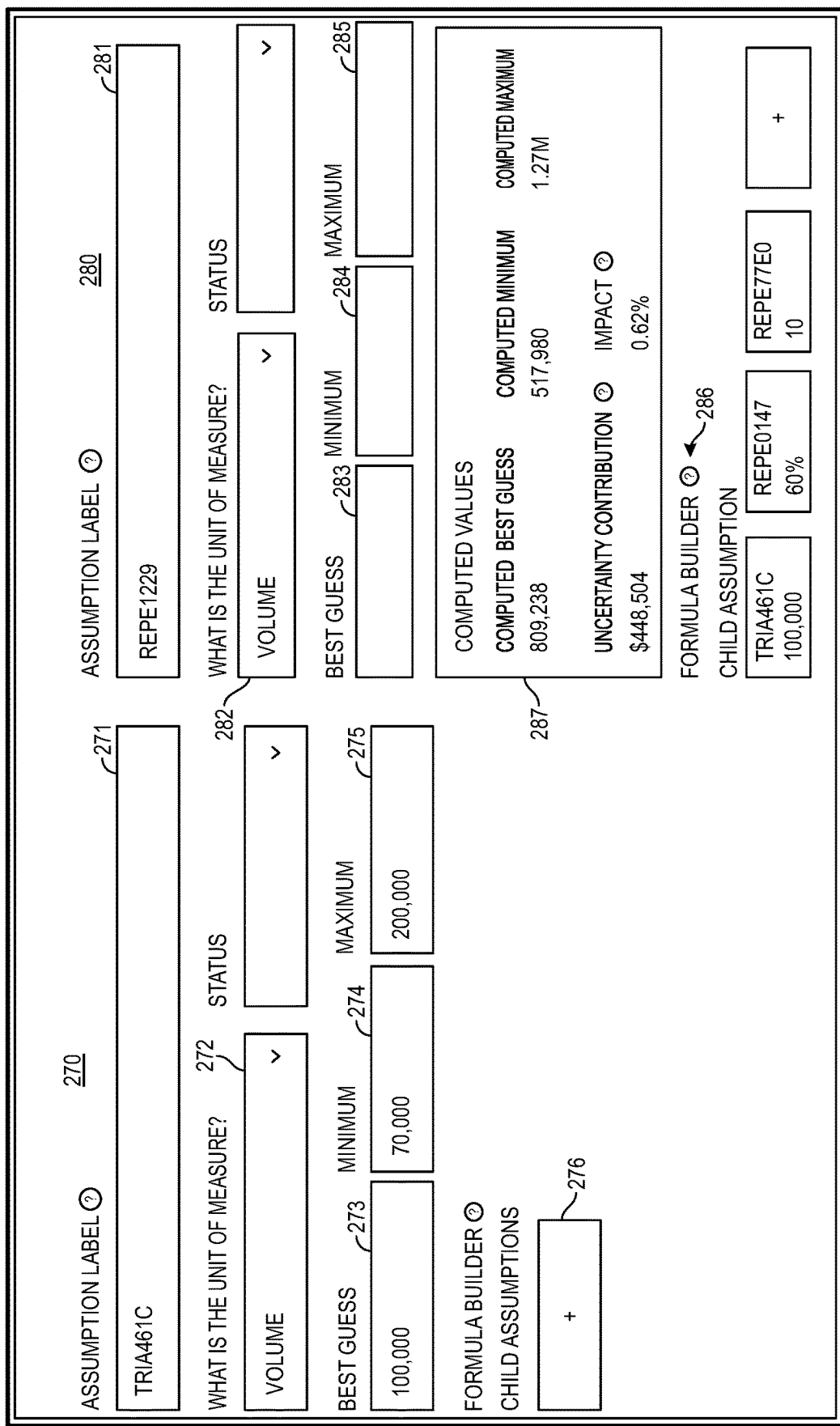
FIG. 2B is an example user interface presented by a client device interacting with the modeling platform, the user interface for configuring a component assumption object of the hierarchical tree of FIG. 2A.

When a user selects a particular assumption object 265, the model builder 121 may be configured to present a user interface that enables the user to configure parameters associated with the assumption object 265. FIG. 2B depicts example user interfaces 270 and 280 presented by the client device 105 that enable the user to configure a particular assumption object 265. The user interface 270 depicts the user configuring the child assumption object 265d of FIG. 2A, whereas the user interface depicts the user configuring the assumption object 265c of FIG. 2A.

For example, the user interface 270 includes a field 271 to assign the assumption object 265*d* a label or name. As another example, the user interface 270 includes a selection element 272 that enables the user to indicate the particular unit of measurement modeled by the assumption object. As an example, if revenue may be generally represented as price*volume. Accordingly, by indicating the unit of measurement via the selection element 272, the user is able to configure which variable the assumption object 265*d*. It should be appreciated that the selection element 272 may enable the user to select any unit of measurement associated with the risk model or only those that directly effect a parent assumption object.

The user interface 270 also includes fields 273-275 that enable a user to define parameters associated with the probability distribution function associated with the assumption object 265*d*. As the text in the field 271 suggests, the assumption object 265*d* corresponds to a triangle distribution functions. Accordingly, the field 274 enables the user to enter the minimum value for the triangle distribution function, the field 275 enables the user to enter the maximum value for the triangle distribution function, and the field 273 enables the user to enter the best guess (e.g., median value) for the triangle distribution function. Accordingly, when the simulating the assumption object 265*d*, the modeling platform 115 will sample a value for the assumption object 265*d* in accordance with the triangle distribution function defined by the fields 273-275. It should be appreciated that other example user interfaces may enable the user to select the type of probability distribution function of the assumption object 265*d*.

As illustrated by FIG. 2A, the assumption object 265*d* is a child assumption object that has no child assumption objects related thereto. Thus, while the user interface 270 includes a formula builder interface 276 to define a formula on how to combine child assumption objects, the formula builder interface 276 does not include a formula. Accordingly, during a simulation, the value for the unit of measurement corresponding to the selection element 272 provided by the assumption object 265*d* will correspond to the sampled value from the triangle distribution function.

On the other hand, the user interface 280 corresponds to the assumption object 265*c* which includes child assumption objects. Accordingly, the user interface 280 also includes a field 281 for assigning the assumption object 265*c* a label or name and a selection element 282 for indicating the unit of measurement the assumption object 265*c*. It should be noted that unit of measurement for the assumption object 265*c* is the same as the unit of measurement for its child assumption 265*d*, however, this is not always the case. To this end, assumption object 265*c* is configured to model repeat customer volume and the child assumption objects are configured to represent the factors that influence repeat customer volume. However, for an assumption object that models, say, revenue, the assumption object may be associated with a price unit of measurement, but include a child assumption object that includes a volume unit of measurement.

Similar to the user interface 270, the user interface 280 also includes a formula builder 286. However, unlike the user interface 270, the user interface 280 includes a formula to combine the values of the child assumption object. While the formula depicted in FIG. 2B is a simple multiplication of the values from the child assumption objects, the user interface 280 may enable the user to define any formula to combine the values from the child assumption objects. It should be further noted that while the user interface 280 includes fields 283-285 to define parameters associated with a probability distribution function, the fields 283-285 are blank.

In some embodiments, the assumption object 265*c* does not have an independent probability distribution function. In these embodiments, when simulating the risk model, the modeling platform 115 may not generate a unique sample for the assumption object 265*c*. Rather, the probability distribution function for the object 265*c* can be expressed by inserting the component probability distribution functions for the child assumption objects into the formula defined by the formula builder 286. Thus, during simulation, the modeling platform may insert the sampled values for the child assumption objects into the formula defined by the formula builder 286 and provide the resulting value to the parent assumption objects (here, 265*a*) to use when calculating the formula corresponding of the parent assumption object.

In other embodiments, during simulation, the modeling platform 115 is configured to estimate values corresponding to the fields 283-285 to use to define a probability distribution function for the assumption object 265*c*. For example, if the simulation is using Monte Carlo sampling techniques to perform a plurality of iterations of the simulation of the child assumption objects, the modeling platform 115 may analyze the plurality of results of the simulation to generate a distribution functions. For example, if the simulation involves 1,000 iterations, the modeling platform may calculate 1,000 values for the assumption object 265*c* based on sampling each of the child assumption objects 1,000 times. The modeling platform 115 may then perform a regression analysis on the 1,000 calculated values for the assumption object 265*c* to generate a probability distribution function for the assumption object 265*c* based on the values displayed in the computed values region 287. Accordingly, in these embodiments, after estimating the parameter values for the assumption object 265*c*, the modeling platform 115 may then sample the generated probability distribution function for the assumption object 265*c* when providing the value to the parent assumption object 265*a*.

Figure 3:
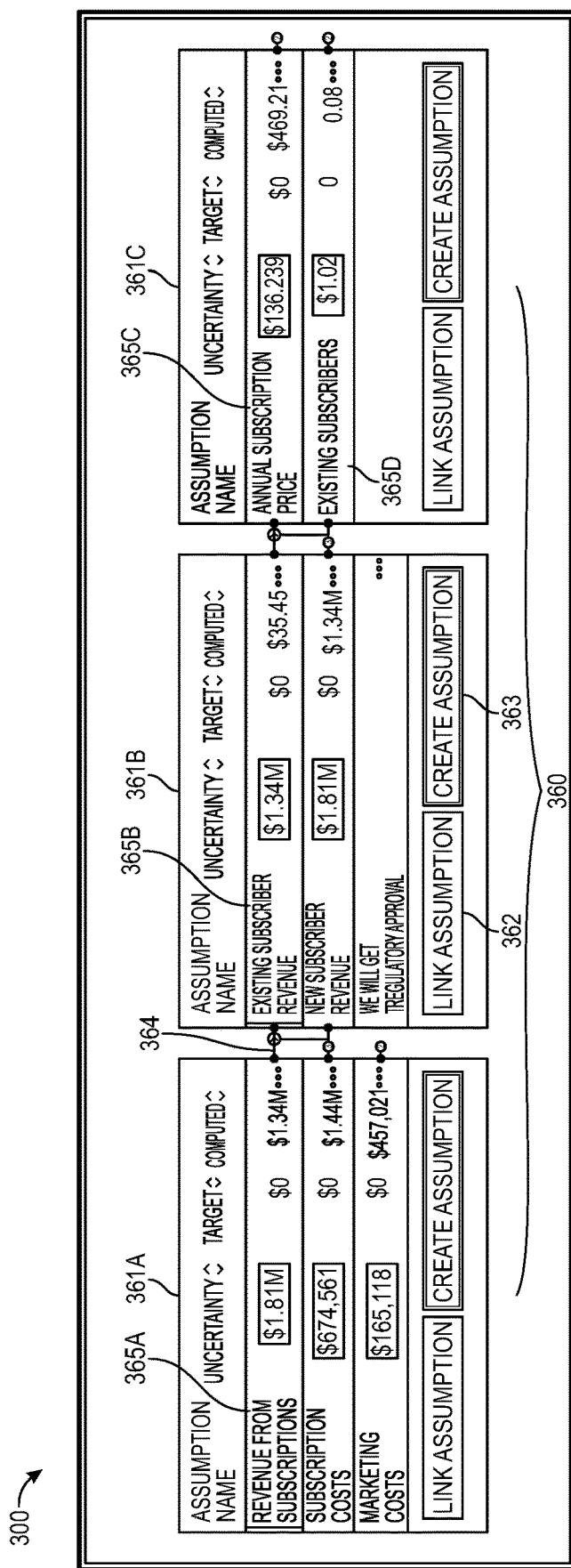
FIG. 3 is an example user interface presented by a client device interacting with the modeling platform, the user interface for modifying a hierarchical tree associated with a risk model.

Turning now to FIG. 3, illustrated is an example user interface 300 presented by the client device 105 interacting with the model builder 121 of the modeling platform 115. In particular, the user interface 300 is configured to enable the user to modify a hierarchical tree 360 associated with a risk model. Unlike the tree view depicted in FIG. 2A, the user interface 300 collapses the hierarchal tree 360 into tier views 361 based on user selections of particular assumption objects 365. Accordingly, the left most side may represent the assumption objects 365 that form the highest level tier of the hierarchical tree 360. As the user selects a particular assumption object in that tier, the model builder 121 may create a new tier view showing the child assumption objects.

In the illustrated example, assumption objects 365*c* and 365*d* in tier view 361*c* are children of assumption object 365*b* in tier view 361*b*, which is a child assumption object of assumption object 365*a* in tier view 361*a*. Accordingly, the user interface 364 includes relational indicators 364 that indicate the relationship between assumption objects 365 across different tiers of the hierarchical tree 360. For the non-selected assumption objects 365 that have child not depicted in the tier view, the relationship indicator 364 instead depicts an indication of the number of child assumption objects 365.

The user interface 300 provides two different ways to add an assumption object to the hierarchical tree 360. The first is the link assumption element 362 configured to enable the user to add an existing assumption object as a child assumption object of the assumption object selected in the higher level tier. The second is the create assumption element 363 configured to enable the user to create a new assumption object to add as a child assumption object of the assumption object selected in the higher level tier. In this illustrated example, the elements 362 and 363 will configure the assumption object 365*a* to include a new child assumption object. In response, the relational data fields for the assumption object 365*a* and/or the new child assumption object are updated to reflect the parent-child relationship.

In response to detecting a user interaction with the element 362, the model builder 121 may present a list of existing assumption objects stored in the database 130. The user may then select a particular assumption object 365 from the list of assumption objects to include as the new child assumption object. In response, the model builder includes an instance of the assumption object in the hierarchical tree 360.

In response to detecting a user interaction with the element 363, the model builder may present a user interface to define a plurality of fields corresponding to the new assumption object. For example, the model builder may present an empty version of the user interface 270 of FIG. 2B.

It should be appreciated that the user interfaces depicted in FIGS. 2A, 2B, and 3 are representations of hierarchical trees after the modeling platform 115 conducts a simulation of the risk model. To this end, until the modeling platform conducts a simulation, the uncertainty values, the impact values, and the computed values are unknown. Accordingly, these fields may be blank until a simulation is conducted. It should be appreciated that due to the simulation of probability distribution functions, each simulation may produce different results. As such, the values presented by the user interfaces of FIGS. 2A, 2B, and 3 may reflect the results of the most recent simulation.

In some embodiments, the user interfaces presented by the model builder 121 also include an element (not depicted) that enables the user to simulate the risk model constructed and/or presented via the model builder 121. In some embodiments, the modeling platform 115 utilizes a default number of iterations (e.g., 1,000, 5,000, 25,000, etc.) to perform when simulating a risk model. In other embodiments, the modeling platform 115 may prompt the user to input a number of iterations to conduct.

The modeling platform 115 may then generate samples for each iteration of the simulation that will be executed. More particularly, for each iteration the modeling platform 115 may use a sampling function to sample values from the probability distribution functions corresponding to assumption objects. For example, the modeling platform 115 may use a Monte Carlo sampling function or another sampling function that generates samples from a probability distribution function. In some embodiments where the probability distribution function is a triangle distribution function, the sampling function may ensure that half of the samples are a between the minimum value and median value and the other half of the samples are between the median value and the maximum value. Accordingly, for each probability distribution function, the sampling algorithm may generate a number of samples corresponding to the number of iterations.

As described above, for some parent assumption objects, the probability distribution function may be determined during by performing the number of simulations with the child assumption objects and performing a regression analysis on the results. Accordingly, to execute the simulation, the modeling platform 115 may begin by iterating the simulation of child assumption objects and then iterating the simulation on the on the next highest tier of the hierarchical tree until the ultimate parent assumption object is simulated. The outcome of the simulation may one or more indications derived from the distribution function generated by performing the regression analysis on the results of the simulations of the ultimate parent assumption object. For example, after simulating the risk model, the modeling platform 115 may provide an indication of a median value of the generated distribution function, an amount of uncertainty in the generated distribution model (e.g., a 90% confidence interval of the generated distribution function, a 95% confidence interval of the generated distribution, an 80% confidence interval of the generated distribution function, etc.), a probability that the outcome will exceed a user-provided target value, and/or other metrics.

Time Simulation

It should be appreciated that while the above techniques are able to provide an instanteous expected outcome for the component assumption objects modeled by the risk model, it is useful to be able to project the risk model over time to gain additional insights related to the assumption objects. Accordingly, the modeling platform 115 includes the time analyzer 122 that enables the user to simulate a risk model defined via the model builder 121 over time.

FIG. 4A is an example user interface 400 presented by the client device 105 interacting with the time analyzer 122 to simulate a risk model over time. As illustrated, the user interface 400 includes an indication of a hierarchical tree 460 defined via the model builder 121. The indication of the hierarchical tree 460 utilizes indentations to indicate the tier of the hierarchical tree 460 to which each component assumption object 465 belongs.

For assumption objects 465 that define independent probability distribution functions, the user interface 400 includes a configuration element 466 that enables the user to assign the assumption object 465 a time function for how the modeled value changes over time. That is, referring back to FIG. 2B, the user interface 400 may include the configuration element 466 if the corresponding assumption object 465 includes values in the fields 273-275, 283-285 presented via the model builder 121. Accordingly, the assumption objects 465*a-c* include a corresponding configuration element 466*a-c*, whereas assumption object 465*d* does not.

Figure 4B:
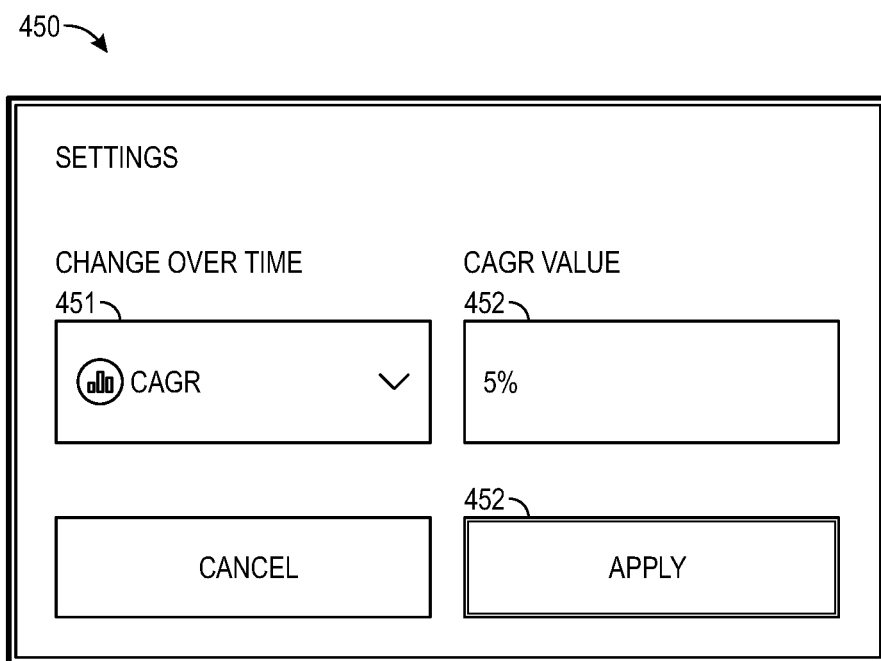
FIG. 4B is an example user interface presented by a client device interacting with the modeling platform, the user interface for configuring the simulation of a component assumption object of the risk model of FIG. 4A.

In response to detecting a user interaction with a configuration element 466, the time analyzer 122 may present a user interface to define a time function for how the value changes over time. FIG. 4B is an example user interface 450 presented by the client device 105 interacting with time analyzer 122 of the modeling platform 115 to define the time function for an assumption object 465. To this end, time analyzer 122 may present the user interface 450 in response to detecting a user interaction with the configuration element 466*c*.

As illustrated, the user interface includes a selection element 451 that enables the user to select a time function to assign the assumption object 465 and a field 452 via which the user defines a value associated with the selected time function. For example, if the user selects compound annual growth rate (CAGR), the field 452 may enable the user to define the CAGR value for the time function. As another example, if the user selects a fixed growth rate via the selection element 451, the field 452 may enable the user to define at which the value the growth rate is fixed. As yet another example, if the user selects a manual or custom growth rate via the selection element 451, the field 452 may enable the user to define a function to assign to the assumption object 465. While the instant disclosure generally refers to CAGR, fixed, or manually-defined growth rates, alternate embodiments may utilize any other time function to define how a value changes over time.

While the example interface 450 enables the user to enter a predetermined value for the growth rates (fixed or CAGR), this value may not be known in each scenario. Accordingly, the user interface 450 may be configured to enable the user to define a probability distribution function corresponding to the rate value for the selected type of time function. As such, the time analyzer 122 is able to account for and/or quantify uncertainty in the predictions on how a value will scale over time.

The user interface 450 also includes an element 452 that enables the user to indicate the defined time function is to be applied to the assumption object 465. In response, the time analyzer 122 may update the assumption object data maintained at the database 130 to include an indication of the time function defined via the user interface 450.

Returning to FIG. 4A, the user interface 400 also includes a time interval selection element 410 via which the user is able to select an interval duration for which values corresponding to the assumption objects 465 are to be provided via the time simulation. For example, the selection element 410 may enable the user to indicate whether the time intervals are yearly, quarterly, or monthly intervals. In the illustrated example, the yearly option is selected.

After assigning time functions to the assumption objects 465, the time analyzer 122 may enable the user to execute the time simulation. To execute the time simulation, the modeling platform 115 may first simulate the risk model defined by the hierarchical tree 460 to obtain instanteous values for each assumption object 465 in the hierarchical tree 460. After the instanteous values are calculated, the time analyzer 122 may then scale the instanteous values by the time function to generate a plurality of time-adjusted values for time intervals of the duration indicated via the selection element 410. The time analyzer 122 may then display the results in the result viewer portion 420.

If an assumption object 465 corresponds to a time function that has a rate associated with a probability density function, the time analyzer 122 may apply Monte Carlo sampling techniques to select a plurality of samples from the probability density function to generate a plurality of values for the assumption object 465 at each time interval. The modeling platform 115 may then perform a regression analysis on the plurality of values at each time interval to generate a median value for the particular time interval and/or an amount of uncertainty associated with each time interval.

As illustrated, the user interface 400 also includes an indication 468 of the CAGR for each assumption object 465. While the indication 468 for an assumption object 465 that includes a user-defined CAGR value (such as assumption object 465c) is typically just the user defined value, not all assumption objects 465 have a user-defined CAGR value. For example, the assumption object 466a has a manually defined time function. As another example, the assumption object 465d is a parent assumption object defined by the values determined for child assumption objects. As yet another example, the CAGR rate may correspond to a probability distribution function. Accordingly, the indication 468 enables the user to understand the CAGR for these types of assumption objects 465.

Uncertainty Contribution Reduction

As described above, the modeling platform 115 also includes a task manager 123 that enables the user to configure tasks that reduce the uncertainty associated with the assumptions that correspond to the assumption objects stored at the assumption object database 130. It should be appreciated that the assumption objects do not introduce equal amounts of uncertainty into the risk model. Accordingly, in order to identify the assumption objects to which a task should be assigned, the modeling platform may calculate an uncertainty contribution for each assumption object in the risk model. As such, the user can develop tasks that are most likely to reduce the uncertainty in the risk model.

To calculate the uncertainty contribution for a particular assumption object, the modeling platform may set each instance of the assumption object to a constant value and re-simulate the risk model. That is, the modeling platform 115 may perform an additional number of iterations of the risk model where the value for the particular assumption object is fixed. The fixed value may be, for example, the median or best guess value associated with the assumption object. Similar to the simulation of the original risk model, the modeling platform 115 may determine an amount of uncertainty in the ultimate parent assumption object.

Based on the difference in the amount of uncertainty for the original risk model and the adjusted risk model where the particular assumption object is held constant, the modeling platform is able to determine an amount of uncertainty introduced by the particular assumption object. For example, if the 90% confidence range is reduced by $100 when the particular assumption object is held constant, then the modeling platform 115 may determine that the particular assumption object introduced $100 of uncertainty. The modeling platform 115 may also express the amount of uncertainty contributed by a particular assumption object as a percentage of the overall amount of uncertainty associated with the risk mode.

The modeling platform 115 may be configured to repeat this process for each assumption object in the risk model. Accordingly, when the modeling platform 115 displays the assumption objects in a hierarchical tree, such as when the modeling platform presents the user interface 200, each assumption object may include an indication of the amount of uncertainty introduced by that assumption object. As such, the user is able to identify the assumption objects that contribute the largest amount of uncertainty to develop tasks that reduce the uncertainty associated therewith.

FIG. 5A is an example user interface 500 presented by the client device 105 interacting with the task manager 123 of the modeling platform 115. The user interface 500 may be configured to enable the user to configure task objects associated with component assumption objects of a risk model, such as a risk model built via the model builder 121.

As illustrated, the user interface 500 includes an element 520 that enables the user to create a new task object to be stored in the task object database 131. The task object may include a task description (field 511), a person assigned to perform the task (field 512), and a task status (field 513). The interface 500 also includes elements 515 that enable the user to assign the task object to one or more relevant assumption objects. Based on the assumption objects to which the task object is assigned, the modeling platform 115 may determine an uncertainty contribution (field 514) associated with the task object. For example, the uncertainty contribution for a task object may be the sum of the uncertainty contributions for the assumption objects to which the task object is assigned.

Figure 5B:
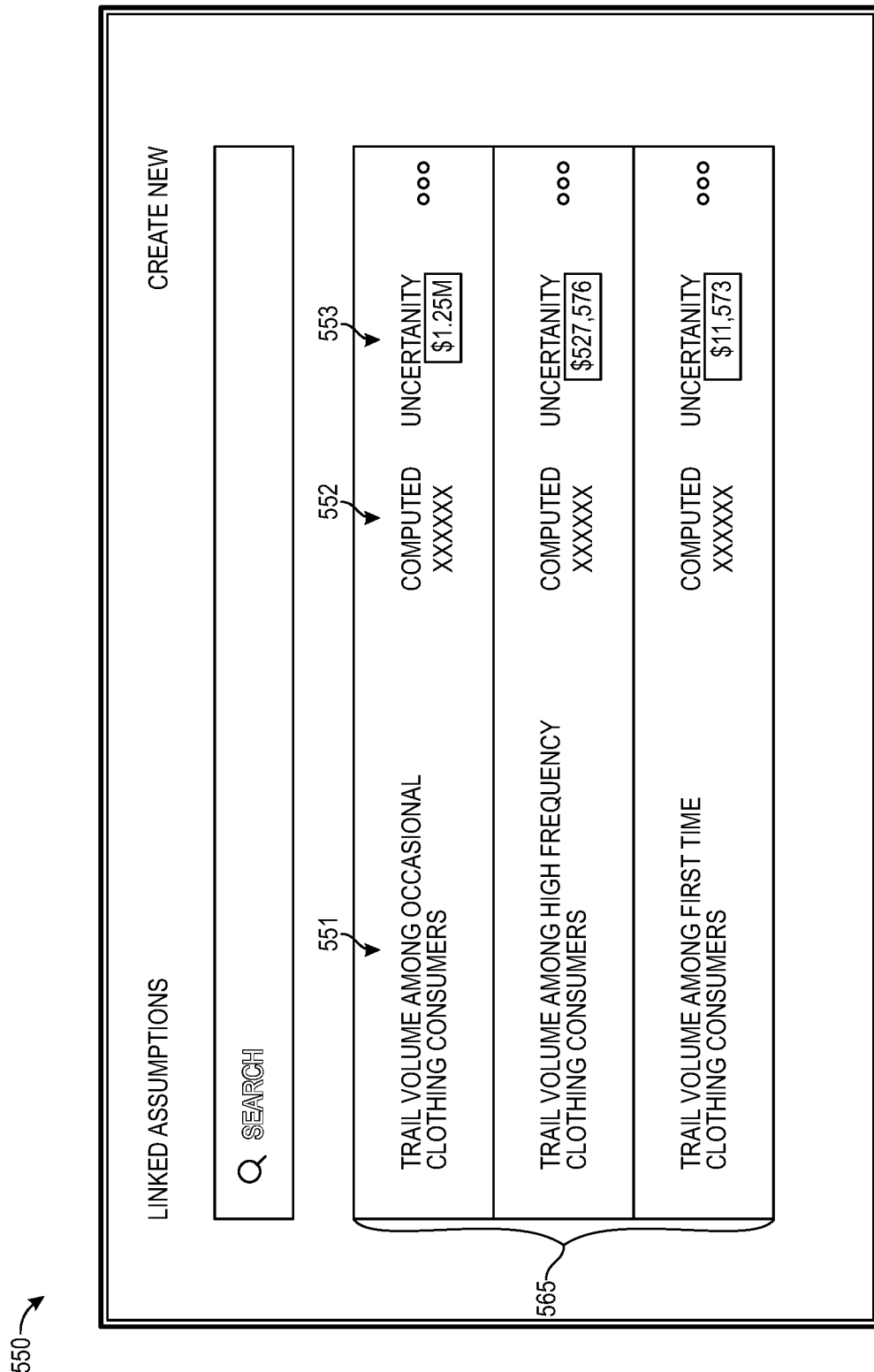
FIG. 5B is an example user interface presented by a client device interacting with the modeling platform, the user interface for viewing the impact of the component assumption objects linked with a task object.

FIG. 5B is an example user interface 550 presented by the client device 105 interacting with the task manager 123 of the modeling platform 115. In particular, the user interface 550 may enable the user to view the impact of assumption objects 565 linked with a task object. For each assumption object 565, the user interface 550 may include an indication 551 of the assumption object description, a computed value 552 of the assumption object from the most recent simulation, and an indication 553 of the amount of uncertainty associated with the link assumption object. Accordingly, the user interface 550 enables the user to see exactly how the performance of the task will reduce uncertainty in the risk model.

In some embodiments, the task manager 124 may detect an indication that a task corresponding to a task object has been completed. For example, a user may interact with the client device 105 to indicate the completion of a task and a plurality of documents detailing the performance of the task and/or the results thereof. Accordingly, the task manager 123 may update the task object database 131 to include indications of and/or references to the supporting documentation provided by the client device 105.

In some embodiments, the task manager 123 analyzes the uploaded documentation to identify values associated with the linked assumption object(s) to assign to the parameters of the probability distribution function. For example, the task manager 123 may apply optical character recognition (OCR) techniques to detect values corresponding to the parameter type modeled by the linked assumption objects. In other embodiments, a task completion interface presented by the task manager 123 may include fields via which the user can indicate the updated values discovered through the performance of the task.

After the values for an assumption object are updated in response to the completion of the task, the modeling platform 115 may re-simulate the risk model and calculate an amount of uncertainty by which the performance of the task has removed from the risk model. To calculate the amount of uncertainty reduced by the performance of the task, the modeling platform 115 may determine a difference between the amount of uncertainty before the completion of the task and the amount of uncertainty after the completion of the task.

Qualitative Assumptions

As described above, the modeling platform 115 includes a scenario tester 124 that enables a user to test the impact of one or more qualitative assumptions related to a risk model built via the model builder 121. As it is used herein, a qualitative assumption is a type of assumption where the impact of the assumption is known, but whether or not the underlying assumption will occur is not. This is in contrast to quantitative assumptions where they are known to occur, but the impact of the assumption is not (and hence are associated with one or more probability distribution functions related to generate values for their impact).

Qualitative assumption objects configured to model the impact of the corresponding qualitative assumption may also be maintained at the assumption object database 130. Accordingly, qualitative assumption objects can be added to a hierarchical tree in a similar manner to the quantitative assumption objects described elsewhere herein. Qualitative assumption objects may include a label indicative of the underlying assumption and an impact value representative of the impact of the qualitative assumption on a parent assumption object. The value may be represented as a percentage by which the parent assumption object is to be scaled if the qualitative object is applied.

In some embodiments, the qualitative assumption objects also include a likelihood that the corresponding qualitative assumption is to occur. In these embodiments, the modeling platform 115 may correspond the qualitative assumption object with a binomial distribution function based on the given likelihood. Accordingly, when the modeling platform 115 simulates a plurality of iterations of the risk model, the modeling platform may sample values from the binomial distribution function such that qualitative assumption object is assumed to occur in a number of iterations that approximately corresponds to the given likelihood. That is, if the given likelihood is p, the modeling platform may apply the impact value for the qualitative assumption in 1−p of the iterations.

Figure 6A:
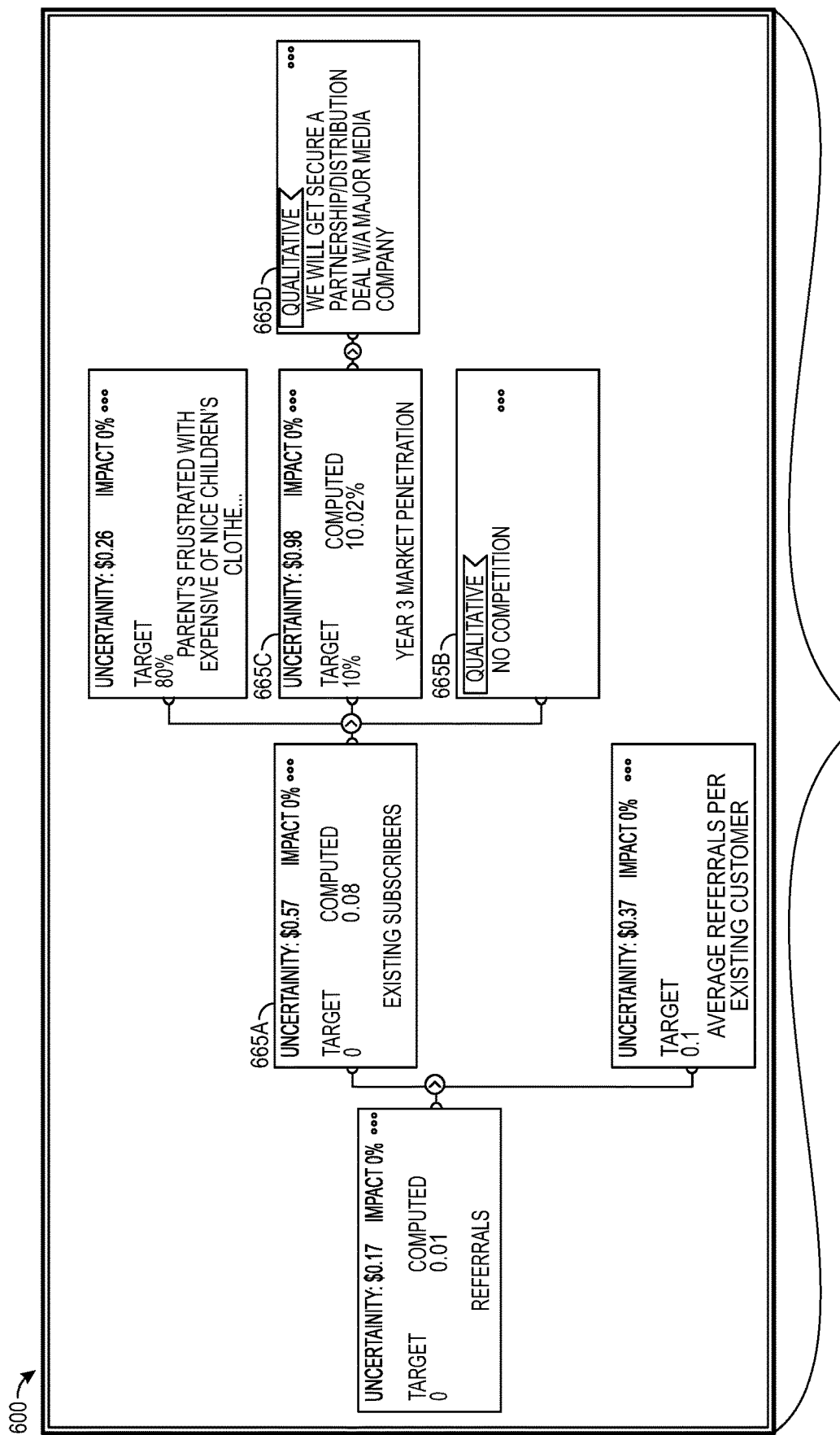
FIG. 6A is an example user interface presented by a client device interacting with the modeling platform, the user interface for viewing a hierarchical tree associated with a risk model that includes qualitative assumption objects.

FIG. 6A is an example user interface presented by the client device 105 interacting with the model builder 121 of the modeling platform 115 to include qualitative assumption objects 665 in a hierarchical tree 660. Qualitative assumption objects 665 are configured to modify the value of the parent assumption object 665 by the fixed amount. Accordingly, during simulation, if a quantitative assumption object 665 includes a child qualitative assumption object 665, after the modeling platform 115 generates a value for the quantitative assumption object 665 in accordance with the techniques described above, the modeling platform 115 then scales the value by the value indicated by the qualitative assumption object 665. In the illustrated scenario, this means that after the modeling platform 115 samples a value from the probability distribution function defined by the quantitative assumption object 665c, the modeling platform 115 scales the value by the impact value indicated by the qualitative assumption object 665d. Similarly, after the modeling platform 115 combines the values from the child assumption objects 665 of the quantitative assumption object 665a in the manner defined via a formula builder (such as the formula builder 286 of FIG. 2B), the modeling platform 115 scales the value by the impact value indicated by the qualitative assumption object 665b.

In some embodiments, qualitative assumptions are assumed to be applicable to the risk model. Accordingly, in these embodiments, the percentage value associated with qualitative assumption objects 665 may indicate a value by the parent is scaled if the qualitative assumption is false. In the illustrated example, the qualitative assumption object 665b relates to the existence of no competition. As such, when this qualitative assumption is false, there is competition. Accordingly, the parent assumption object 665a, which relates to a number of existing subscribers, should decrease in response. Accordingly, the qualitative assumption object 665b may have a negative impact value.

Figure 6B:
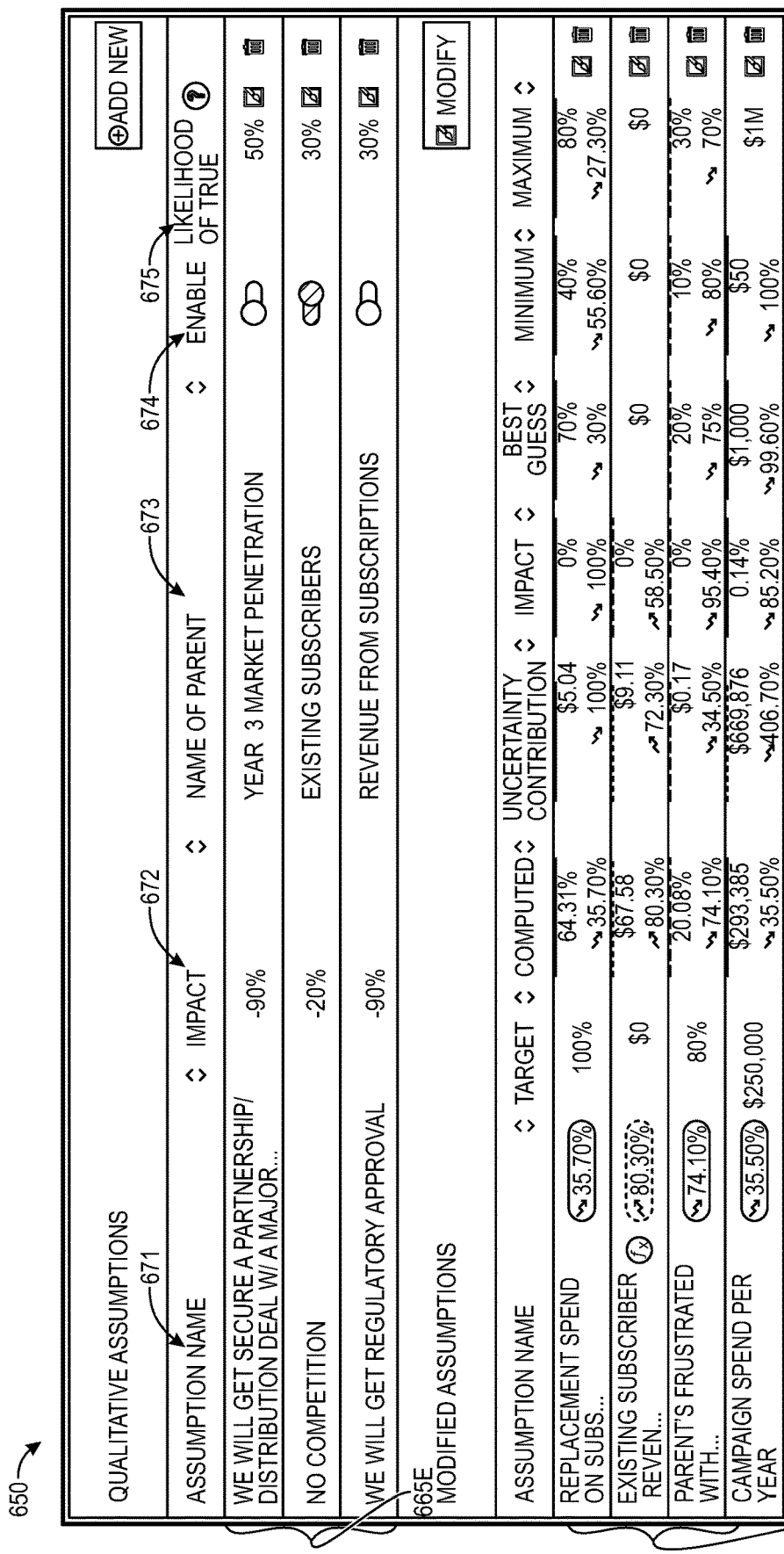
FIG. 6B is an example user interface presented by a client device interacting with the modeling platform, the user interface for simulating an impact of qualitative assumption objects within a risk model.

Because qualitative assumptions are uncertain to occur, it is useful to simulate the impact of different combinations of qualitative assumption objects being enabled or disabled. FIG. 6B is an example user interface presented by the client device 105 interacting with the scenario tester 124 of the modeling platform 115. More particularly, the user interface 650 is configured to simulate an impact of the qualitative assumption objects 665e on parent assumption objects 665f.

For each qualitative assumption object 665e, the user interface may indicate an assumption name (field 671), an impact value (field 672), a name of the parent assumption object (field 673), and a likelihood that the qualitative assumption is true (field 675). Additionally, each qualitative assumption object 665e includes a toggle element 674 that enables the user to indicate whether or not the corresponding qualitative assumption object 665e is to be enabled in the simulation. If the qualitative assumption object 665e is enabled, during simulation of the risk model, the modeling platform 115 may generate samples from the corresponding binomial distribution. On the other hand, if the qualitative assumption object 665e is disabled, the modeling platform 115 may omit the qualitative assumption object 665e from the simulation.

After the user indicates which qualitative assumptions are enabled, the user may interact with another user interface element (not depicted) to simulate the risk model based on the user indications. As part of this simulation, the scenario tester 124 may also calculate an impact of the enabled assumptions on parent assumption objects 665f. It should be appreciated that the parent assumption objects 665f are not necessarily the direct parent assumption object 665, as the impact of the qualitative assumptions may also adjust the values for any parent assumption object thereof.

For each parent assumption object 665f, the scenario tester 124 may determine a change in a plurality of values associated with the parent assumption object 665f. For example, the median ("computed") value of the parent assumption object 665f, the uncertainty contribution of the parent assumption object 665f, an impact of the parent assumption object 665f, and so on. To determine the change in the values, the scenario tester 124 may first simulate the risk model with the qualitative assumptions disabled to determine baseline values for the parent assumption objects 665f. To this end, the scenario tester 124 may cause the modeling platform 115 to perform techniques described above with respect to calculating an uncertainty contribution for an assumption object. The scenario tester 124 may then re-execute the simulation using the qualitative assumption objects 665e that are enabled via the toggle elements 674 and calculate the adjusted values. The difference in these values may represent the impact of the enabled qualitative assumption objects 665e on the parent assumption objects 665f.

It should be understood that the user interfaces depicted in FIGS. 2A-6B represent example user interfaces that enables a user to cause the modeling platform 115 to perform the described functionality. Any number of alternate user interfaces, including user interfaces with additional, fewer, or alternate user interface elements, may be implemented in other embodiments to achieve the described functionality.

Example Methods

Figure 7:
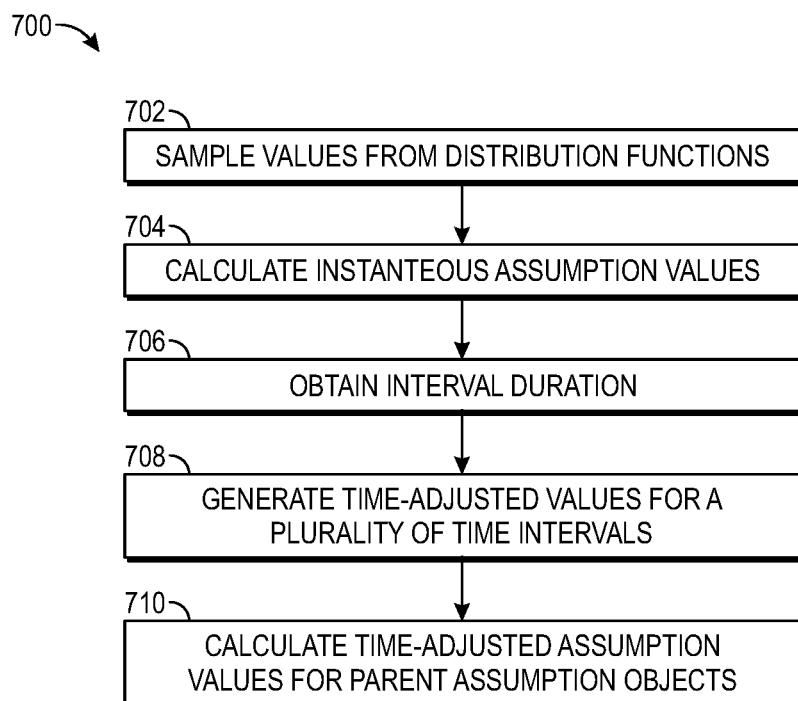
FIG. 7 is an example flow diagram for simulating a risk model over time via the modeling platform of FIG. 1A.

FIG. 7 is a flow diagram for an example method 700 of simulating a risk model over time. The method 700 may be performed by one or more processors of a modeling platform (such as the modeling platform 115 of FIG. 1A). In some embodiments, the modeling platform is configured to execute the method 700 as part of executing a time analyzer program (such as the time analyzer 122 of FIG. 1A).

As described herein, the simulated risk model may include or be defined by a hierarchical tree (such as the hierarchical trees 260, 360, 460, or 660) formed of component assumption objects (such as the assumption objects 265, 365, 465, 565, or 665) having a parent-child relationship. The hierarchical tree includes assumption objects (typically child assumption objects) that correspond to a distribution function (such as triangle distribution function, a normal distribution function, etc.). These assumption objects also correspond to a time function (such as a compound annual growth rate function or a fixed growth rate function). Generally, a simulated value for a parent assumption object is based upon the distribution functions for the child assumption objects.

The method 700 begins at block 702 when the modeling platform samples a value from the distribution functions corresponding to the assumption objects. That is, the modeling platform may sample values from the distribution functions corresponding to assumption objects included in the hierarchical tree.

In some embodiments, the modeling platform is configured to simulate a plurality of iterations of the risk model. Accordingly, the modeling platform may be configured to obtain a number of iterations of the risk model to simulate. The number of iterations may be obtained via a user interface or from a default value maintained at the modeling platform. In these embodiments, when the modeling platform samples the values from the distribution functions, the modeling platform may instead obtain a number of samples from each distribution function corresponding to the number of iterations to simulate. To generate the samples from each distribution function, the modeling platform may apply a sampling function, such as a Monte Carlo sampling function. The modeling platform may then correspond each sample to a particular iteration of the simulation.

At block 704, the modeling platform may calculate an instantaneous assumption value for the assumption objects based on the sampled value(s) for the assumption object and/or the sampled values for child assumption objects. That is, for child assumption objects, the modeling platform may assign the child assumption object the sampled value; whereas, for parent assumption objects, the modeling platform may combine the values assigned to the child assumption objects using a formula (such as a formula defined via the formula builder 286).

In embodiments where the modeling platform performs a plurality of iterations, the modeling platform may perform, using the corresponding samples, the number of iterations of the simulation wherein each simulation uses the corresponding sample assigned to that iteration for each distribution function. Based on outcomes of the iterated simulations, the modeling platform may generate a new distribution function corresponding to the risk model and/or the parent assumption objects included therein. That is, the modeling platform may analyze the plurality of calculated values for the parent assumption objects across each of the iterated simulations and perform a regression analysis to generate the new distribution function. The modeling platform may then assign the median value (or another relevant value) of the new distribution function as the value for the parent assumption object.

At block 706, the modeling platform obtains an interval duration for the time simulation. For example, the modeling platform may obtain the time duration via the selection element 410 of FIG. 4A.

At block 708, the modeling platform executes the time simulation by generating a time-adjusted value for a plurality of time intervals of the obtained interval duration. That is, for the assumption objects included in the hierarchical tree, the modeling platform may generate a plurality of values respectively corresponding to a plurality of time intervals separated by the time duration. For the assumption objects that correspond to a time function, the modeling platform generates the time-adjusted value by applying the time function for the assumption object to the respective instanteous assumption value using a plurality of time values that correspond to the time intervals.

At block 710, the modeling platform then calculates time-adjusted assumption values for the parent assumption objects based on the time-adjusted values for the child assumption objects calculated at block 708. That is, for the values at each time interval, the modeling platform may apply a formula (such as a formula defined via the formula builder 286) to combine the time-adjusted values for the child assumption objects.

In some embodiments, a particular time function is a time function associated with a distribution function for a growth rate for the time function. Accordingly, the modeling platform may sample the distribution function for the particular time function to obtain the growth rate for the particular time function. Accordingly, the time function used at block 708 to calculate the time-adjusted values may utilize the sampled value for the growth rate in the particular time function.

In some embodiments, the modeling platform enables the user to configure the risk model, for example, by executing a model builder (such as the model builder 121 of FIG. 1A). Accordingly, the modeling platform may be configured to present a user interface that enables a user to define the distribution function associated with the component assumption objects (such as via the user interface 270 and 280 of FIG. 2B) and/or define the hierarchal relationships between the component assumption objects that form the hierarchical tree (such as via the user interface 300 of FIG. 3). In some embodiments, the user interface enables the user to include multiple instances of a particular component function object in the hierarchical tree. When there are multiple instances of a particular assumption object, the modeling platform applies the same calculated instanteous assumption value to each instance of the assumption object. Additionally, in some embodiments, including an instance of the particular component function object also includes an instance of the child assumption objects for the particular component function object.

Additionally or alternatively, the modeling platform may present a user interface that enables the user to define the time function for the component assumption objects (such as the user interface 450 of FIG. 4B).

Figure 8:
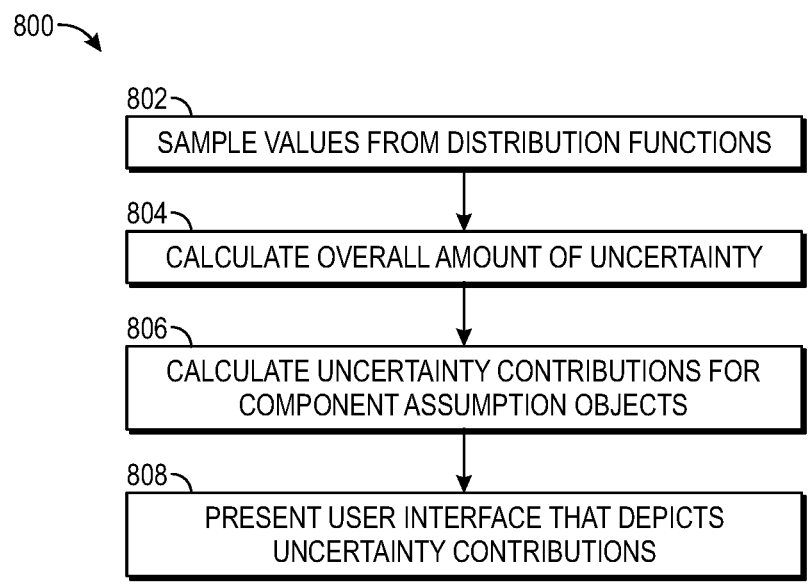
FIG. 8 is an example flow diagram for identifying sources of uncertainty in a risk model via the modeling platform of FIG. 1A.

FIG. 8 is a flow diagram for an example method 800 of identifying sources of uncertainty in a risk model. The method 800 may be performed by one or more processors of a modeling platform (such as the modeling platform 115 of FIG. 1A). In some embodiments, the modeling platform is configured to execute the method 800 in conjunction with a task manager program (such as the task manager 123 of FIG. 1A).

As described herein, the simulated risk model may include or be defined by a hierarchical tree (such as the hierarchical trees 260, 360, 460, or 660) formed of component assumption objects (such as the assumption objects 265, 365, 465, 565, or 665) having a parent-child relationship. The hierarchical tree includes component assumption objects that include indications of distribution function parameters associated with the assumption object (such as triangle distribution function, a normal distribution function, etc.). Similarly, the component assumption objects include an indication of a relationship to other assumption objects. For a parent assumption object, the distribution function parameters may be a value produced by a distribution function of a child assumption object (or a child assumption object thereof) that is combined with other values produced by other child assumption objects via a formula, such as a formula defined via the formula builder 286 of FIG. 2B.

The method 800 being at block 802 when the modeling platform samples, using a sampling function, the distribution functions of the component assumption objects to generate a distribution function associated with the risk model. For example, the modeling platform may apply a Monte Carlo sampling algorithm to generate a sample from the distribution functions included in the hierarchal tree for each iteration of the risk model to be simulated.

At block 804, the modeling platform calculates an overall amount of uncertainty associated with the risk model. For example, the modeling platform may analyze the results of the ultimate parent assumption object of the risk model produced by each iteration of the risk model. Based on these results, the modeling platform may perform a regression analysis to generate a distribution function for the ultimate parent assumption object. Accordingly, the modeling platform may determine the amount of uncertainty by determining a range for a median 90% confidence interval of the generated distribution function.

At block 806, the modeling platform calculates an uncertainty contribution associated with the component assumption objects of the hierarchical tree. To calculate the uncertainty contribution for a particular component assumption object, the modeling platform may first set the particular component assumption object to be a constant value (such as the median value or best guess value of the associated distribution function) and execute an additional simulation of the risk model. More particularly, the modeling platform may perform an addition number of iterations of the risk model to generate an adjusted distribution function for the risk model (and/or the ultimate parent assumption object thereof). The modeling platform may then calculate an adjusted amount of uncertainty associated with the adjusted distribution function for the risk model. The uncertainty contribution for the particular component assumption object may be based on the difference between the overall amount of uncertainty and the adjusted amount of uncertainty.

At block 808, the modeling platform presents a user interface that depicts representations of the component assumption functions and their corresponding uncertainty contributions. For example, the modeling platform may present the user interface 200 of FIG. 2A or the user interface 300 of FIG. 3. In some embodiments, the modeling platform configures the user interface to enable a user to define the distribution function associated with the component assumption objects and define the hierarchal relationships between the component assumption objects that form the hierarchical tree.

As described elsewhere herein, presenting the uncertainty contributions for the component assumption objects enables the user to identify the largest sources of uncertainty in the risk model to design tasks intended to reduce the uncertainty associated therewith. Accordingly, the modeling platform may be configured to correspond a first component assumption object with a task object that includes (i) an indication of one or more related assumption objects, and (ii) an indication of a task that, when performed, changes uncertainty associated with the one or more related assumption objects. It should be appreciated that the task may reduce uncertainty associated with multiple assumption objects and thus be linked to as many assumption objects as the user believes relevant. When the modeling platform corresponds an assumption object with a task object, the modeling platform may also update the assumption object to include an indication of the task object.

In some embodiments, the modeling platform may receive an indication that a task associated with the task object has been performed. In some embodiments, the indication includes one or more documents relating to the performance of the task. The modeling platform may store the documents and update the task object to include a reference to the stored documents. Additionally, the modeling platform may be configured to analyze the indication (and/or the document included therein) to determine updated values for the distribution function parameters for assumption objects related to the task object. Based on the updated values for the distribution function for function objects related to the task object, the modeling platform may execute a simulation of the risk model to quantify how much the performance of the task has reduced uncertainty associated with the risk model.

Figure 9:
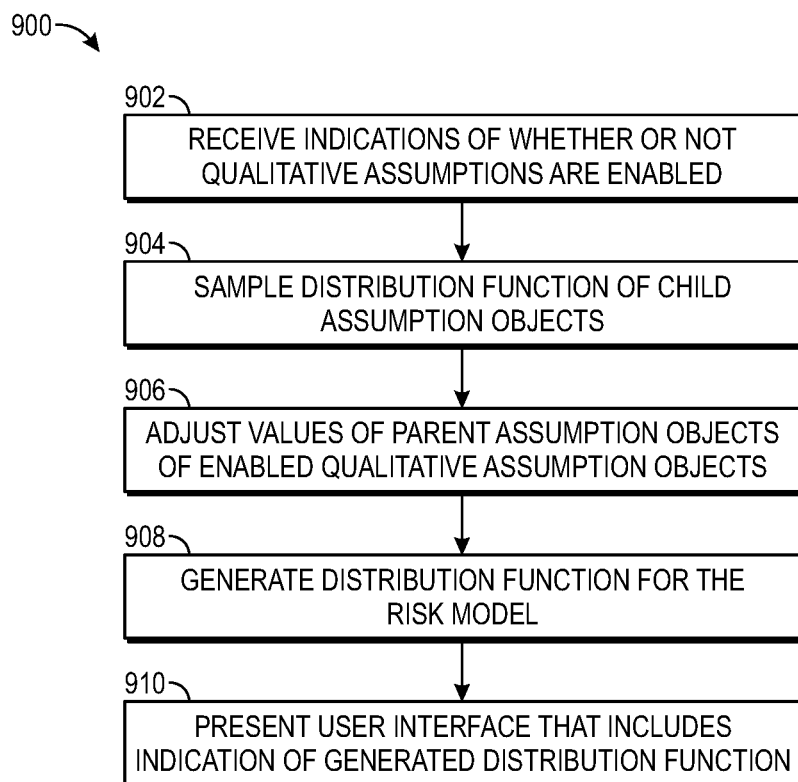
FIG. 9 is an example flow diagram for simulating the impact of qualitative assumptions via the modeling platform of FIG. 1A.

FIG. 9 is a flow diagram for an example method 900 of simulating the impact of qualitative assumptions in a risk model. The method 900 may be performed by one or more processors of a modeling platform (such as the modeling platform 115 of FIG. 1A). In some embodiments, the modeling platform is configured to execute the method 900 in conjunction with a scenario tester program (such as the scenario tester 124 of FIG. 1A).

As described herein, the simulated risk model may include or be defined by a hierarchical tree (such as the hierarchical trees 260, 360, 460, or 660) formed of component assumption objects (such as the assumption objects 265, 365, 465, 565, or 665) having a parent-child relationship. The hierarchical tree includes quantitative assumption objects that include indications of distribution function parameters associated with the assumption object (such as triangle distribution function, a normal distribution function, etc.) and qualitative assumption objects that indicate include an indication of an impact on a parent quantitative assumption. Additionally, the component assumption objects (quantitative and qualitative) include an indication of a relationship to other assumption objects. For a parent quantitative assumption object, the distribution function parameters may be a value produced by a distribution function of a child quantitative assumption object (or a child assumption object thereof) that is combined with other values produced by other child assumption objects via a formula, such as a formula defined via the formula builder 286 of FIG. 2B.

The method 900 may begin at block 902 when the modeling platform receives an indication of whether or not qualitative assumption objects included in the hierarchical tree are enabled. For example, the modeling platform may detect the state of the toggle elements 674 of the user interface 650. If a qualitative assumption object is disabled, the modeling platform may exclude the qualitative assumption object when executing a simulation. On the other hand, a simulation of the risk model may account for qualitative assumption objects that are enabled.

To execute a simulation, at block 904, the modeling platform samples, using a sampling function, the distribution functions of child quantitative assumption objects included in the hierarchical tree. For example, the sampling function may be a Monte Carlo sampling function. As described herein, some qualitative assumption objects also include an indication of a probability of the qualitative assumption occurring. Accordingly, the modeling platform may associate these qualitative assumption object with a binomial distribution function based on the indicated probability. In these embodiments, the modeling platform may also generate sample of the binomial distribution to indicate whether or not the qualitative assumption is true in a given iteration of the risk model.

At block 906, the modeling platform adjusts the values of the parent quantitative assumption objects by the impact corresponding to enabled child qualitative assumption objects. In embodiments where the risk model includes qualitative assumption objects that include an indication of a probability of the qualitative assumption occurring, the risk model may only adjust the value of the parent quantitative assumption object if the sample of the binomial distribution function for the enabled qualitative assumption object indicates the qualitative assumption is false.

At block 908, the modeling platform generates a distribution function corresponding to the risk model (and/or the ultimate parent assumption object thereof) based on the adjusted values for the affected parent quantitative assumption objects. For example, the modeling platform may analyze the results of the ultimate parent assumption object of the risk model produced by each iteration of the risk model. Based on these results, the modeling platform may perform a regression analysis to generate a distribution function for the ultimate parent assumption object.

At block 910, the modeling platform presents a user interface that includes an indication of the generated distribution function. For example, the indication of the generated distribution function may be a range corresponding to a median 90% confidence interval of the generated distribution function, a median value of the generated distribution function, or a likelihood that the risk model results in a value that exceeds a threshold value.

In some embodiments, the modeling platform may be configured to calculate an uncertainty contribution for the enabled qualitative assumption objects. To calculate the uncertainty contribution for a particular qualitative assumption object, the modeling platform may first calculate an overall amount of uncertainty associated with the risk model (e.g., a range corresponding to a median 90% confidence interval of the generated distribution function). The modeling platform may then execute an additional simulation (or an additional plurality of iterations of the simulation) that exclude the particular qualitative assumption object. Based on the results of the additional simulation, the modeling platform may generate an adjusted distribution function and calculate an adjusted overall amount of uncertainty associated therewith. Accordingly, the uncertainty contribution for the qualitative assumption object may be the difference between the overall amount of uncertainty and the adjusted overall amount of uncertainty.

Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for practicing the techniques disclosed herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A computer system for simulating a risk model over time, the system comprising:
   one or more processors; and
   one or memories configured to store (i) a risk model corresponding to a model distribution function, and (ii) computer executable instructions that, when executed by the one or more processors, cause the system to execute a simulation of the risk model, wherein the risk model includes:
      a hierarchical tree formed of component assumption objects having a parent-child relationship, wherein assumption objects correspond to object distribution functions, wherein:
         a simulated value for a parent assumption object is based upon the object distribution functions for the child assumption objects, and
         the assumption objects correspond to time functions;
   wherein to execute the simulation, the instructions, when executed cause the system to:
      sample a value from the object distribution functions corresponding to the assumption objects;
      calculate an instantaneous assumption value for the assumption objects based on the sampled value for the assumption object and/or the sampled values for child assumption objects;
      obtain an interval duration for the simulation;
      generate a time-adjusted value for a plurality of time intervals of the obtained interval duration by applying the time function for the assumption objects to the respective instantaneous assumption values;
      calculate a time-adjusted assumption value for parent assumption objects based on the time-adjusted values for the assumption objects;
      obtain a number of iterations of the risk model to simulate;
      obtain the number of samples from the object distribution functions in accordance with a sampling function, wherein the samples respectively correspond to an iteration of the simulation;
      perform, using the corresponding samples, the number of iterations; and
      apply a regression analysis to outcomes of the iterated simulations to update the model distribution function corresponding to the risk model.

2. The computer system of claim 1, wherein:
   a particular object distribution function for a particular component assumption object is a triangle distribution function; and
   to obtain the number of samples from the particular object distribution function for the particular component assumption object, the instructions, when executed, cause the computer system to select about half of the samples below a given value of the triangle distribution function and about half of the samples above the given value of the triangle distribution function.

3. The computer system of claim 1, wherein the sampling function is a Monte Carlo sampling function.

4. The computer system of claim 1, wherein a particular time function of the time functions is a fixed time function or a compound annual growth rate (CAGR) time function.

5. The computer system of claim 4, wherein:
   the particular time function is associated with a distribution function for a growth rate for the particular time function; and
   the instructions, when executed, cause the system to sample the distribution function for the particular time function to obtain the growth rate for the particular time function.

6. The computer system of claim 1, wherein the instructions, when executed, cause the computer system to:
   present a user interface that enables a user to:
      define the object distribution functions associated with the component assumption objects; and
      define the hierarchal relationships between the component assumption objects that form the hierarchical tree.

7. The computer system of claim 6, wherein the user interface is further configured to enable the user to define the time function for the component assumption objects.

8. The computer system of claim 6, wherein:
   the user interface enables the user to include multiple instances of a particular component function object in the hierarchical tree, wherein including an instance of the particular component function object includes an instance of the child assumption objects for the particular component function object.

9. The computer system of claim 8, wherein to calculate the instantaneous assumption value for the particular component assumption object, the instructions, when executed, cause the computer system to:
apply the calculated instantaneous assumption value to each instance of the particular component assumption object in the hierarchical tree.

10. A computer-implemented method for simulating a risk model over time, the risk model corresponding to a model distribution function and including a hierarchical tree formed of component assumption objects having a parent-child relationship, wherein (i) assumption objects correspond to object distribution functions, (ii) a simulated value for a parent assumption object is based upon the distribution functions for the child assumption objects, and (iii) the assumption objects correspond to time functions, the method comprising:
sampling, by one or more processors, a value from the object distribution functions corresponding to the assumption objects;
calculating, by the one or more processors, an instantaneous assumption value for the assumption objects based on the sampled value for the assumption object and/or the sampled values for child assumption objects;
obtaining, by the one or more processors, an interval duration;
generating, by the one or more processors, a time-adjusted value for a plurality of time intervals of the obtained interval duration by applying the time function for the assumption objects to the respective instantaneous assumption values;
calculating, by the one or more processors, a time-adjusted assumption value for parent assumption objects based on the time-adjusted values for the assumption objects;
obtaining, by the one or more processors, a number of iterations of the risk model to simulate;
obtaining, by the one or more processors, the number of samples from the object distribution functions in accordance with a sampling function, wherein the samples respectively correspond to an iteration of the simulation;
performing, by the one or more processors using the corresponding samples, the number of iterations; and
applying, by the one or more processors, a regression analysis to outcomes of the iterated simulations to update the model distribution function corresponding to the risk model.

11. The computer-implemented method of claim 10, wherein the sampling function is a Monte Carlo sampling function.

12. The computer-implemented method of claim 10, wherein a particular time function of the time functions is a fixed time function or a compound annual growth rate (CAGR) time function.

13. The computer-implemented method of claim 12, wherein:
a particular time function is associated with a distribution function for a growth rate for the particular time function;
the method comprises sampling, by the one or more processors, the distribution function for the particular time function to obtain the growth rate for the particular time function.

14. The computer-implemented method of claim 10, further comprising:
presenting, by the one or more processors, a user interface that enables a user to:
define the object distribution functions associated with the component assumption objects; and
define the hierarchal relationships between the component assumption objects that form the hierarchical tree.

15. The computer-implemented method of claim 14, wherein presenting the user interface comprises:
enabling, by the one or more processors, the user to define the time function for the component assumption objects.

16. The computer-implemented method of claim 14, wherein:
the user interface enables the user to include multiple instances of a particular component function object in the hierarchical tree, wherein including an instance of the particular component function object includes an instance of the child assumption objects for the particular component function object.

17. The computer-implemented method of claim 16, wherein calculating the instantaneous assumption value for the particular component assumption object comprises:
applying, by the one or more processors, the calculated instantaneous assumption value to each instance of the particular component assumption object in the hierarchical tree.

18. A non-transitory computer-readable medium storing computer executable instructions thereon, the instructions, when executed by one or more processors, simulate a risk model over time, the risk model corresponding to a model distribution function and including a hierarchical tree formed of component assumption objects having a parent-child relationship, wherein (i) assumption objects correspond to object distribution functions, (ii) a simulated value for a parent assumption object is based upon the object distribution functions for the child assumption objects, and (iii) the assumption objects correspond to time functions, wherein to simulate the risk model, the instructions, when executed, cause the one or more processors to:
sample a value from the object distribution functions corresponding to the assumption objects;
calculate an instantaneous assumption value for the assumption objects based on the sampled value for the assumption object and/or the sampled values for child assumption objects;
obtain an interval duration;
generate a time-adjusted value for a plurality of time intervals of the obtained interval duration by applying the time function for the assumption objects to the respective instantaneous assumption values;
calculate, a time-adjusted assumption value for parent assumption objects based on the time-adjusted values for the assumption objects;
obtain a number of iterations of the risk model to simulate;
obtain the number of samples from the object distribution functions in accordance with a sampling function, wherein the samples respectively correspond to an iteration of the simulation;
perform, using the corresponding samples, the number of iterations; and apply a regression analysis to outcomes of the iterated simulations to update the model distribution function corresponding to the risk model.

\* \* \* \* \*